(12) United States Patent
Park (10) Patent No.: US 11,886,237 B2
(45) Date of Patent: Jan. 30, 2024

(54) WINDOW, DISPLAY DEVICE INCLUDING THE SAME, AND METHOD OF FABRICATING THE WINDOW

(71) Applicant: Samsung Display Co., LTD., Yongin-si (KR)

(72) Inventor: Jintaek Park, Uiwang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/121,523

(22) Filed: Mar. 14, 2023

(65) Prior Publication Data

US 2023/0213966 A1 Jul. 6, 2023

Related U.S. Application Data

(62) Division of application No. 17/005,176, filed on Aug. 27, 2020, now Pat. No. 11,630,484.

(30) Foreign Application Priority Data

Jan. 7, 2020 (KR) .................. 10-2020-0001960

(51) Int. Cl.
- *G06F 1/16* (2006.01)
- *G06K 19/06* (2006.01)
- *B41M 3/00* (2006.01)
- *G02B 1/14* (2015.01)

(52) U.S. Cl.
CPC ........... *G06F 1/1609* (2013.01); *B41M 3/003* (2013.01); *G02B 1/14* (2015.01); *G06K 19/06046* (2013.01)

(58) Field of Classification Search
CPC .................................................... G06F 1/1609
See application file for complete search history.

(56) References Cited

U.S. PATENT DOCUMENTS

| 9,449,294 | B2 | 9/2016 | Hwang et al. |
| 10,031,560 | B2 | 7/2018 | Han et al. |
| 11,630,484 | B2 * | 4/2023 | Park ................. G06K 19/06046 361/679.02 |
| 2002/0006786 | A1 | 1/2002 | Mine |

(Continued)

FOREIGN PATENT DOCUMENTS

| JP | 2013-044782 | 3/2013 |
| KR | 10-2017-0059539 | 5/2017 |
| KR | 10-1993239 | 6/2019 |

OTHER PUBLICATIONS

Notice of Allowance dated Dec. 28, 2022, issued to U.S. Appl. No. 17/005,176.

*Primary Examiner* — Adrian S Wilson
(74) *Attorney, Agent, or Firm* — H.C. Park & Associates, PLC (57) ABSTRACT

A window including a base substrate, which includes a transmission region and a bezel region in a plan view and includes a front surface and a rear surface that are opposite to each other in a thickness direction, a light-blocking layer, which is disposed on the rear surface of the base substrate and is overlapped with the bezel region, and a printing layer, which is disposed on the light-blocking layer and has a target surface, in which a barcode pattern is formed. The printing layer may have a chromatic color, and a width of the printing layer may be less than a width of the light-blocking layer.

3 Claims, 10 Drawing Sheets

(56) References Cited

U.S. PATENT DOCUMENTS

| | | | | |
|---|---|---|---|---|
| 2005/0078164 A1* | 4/2005 | Kwon | ............... | B41J 3/28 |
| | | | | 347/107 |
| 2009/0020617 A1* | 1/2009 | Kwon | ............... | B41J 3/01 |
| | | | | 235/494 |
| 2013/0171425 A1* | 7/2013 | Wang | ............... | B44C 1/228 |
| | | | | 428/172 |
| 2017/0147040 A1 | 5/2017 | Han et al. | | |

* cited by examiner

WINDOW, DISPLAY DEVICE INCLUDING THE SAME, AND METHOD OF FABRICATING THE WINDOW

CROSS-REFERENCE TO RELATED APPLICATIONS

This application is a division of U.S. patent application Ser. No. 17/005,176, filed on Aug. 27, 2020, which claims priority from and the benefit of Korean Patent Application No. 10-2020-0001960, filed on Jan. 7, 2020, which are hereby incorporated by reference for all purposes as if fully set forth herein.

BACKGROUND

Field

Embodiments of the invention relate to generally to a window (in particular, having a reduced bezel area), a display device including the window, and a method of fabricating the window.

Discussion of the Background

Recently, as portable electronic devices are widely used, their functions and designs are becoming increasingly diversified. In general, users prefer an electronic device with a wide display area and a narrow bezel area. Accordingly, electronic devices of various shapes have been developed to reduce the area of the bezel region. In addition, various fabrication methods are being proposed to further reduce the area of the bezel region.

The above information disclosed in this Background section is only for understanding of the background of the inventive concepts, and, therefore, it may contain information that does not constitute prior art.

SUMMARY

An embodiment of the inventive concept provides a window with a reduced bezel area, a display device including the window, and a method of fabricating the window.

Additional features of the inventive concepts will be set forth in the description which follows, and in part will be apparent from the description, or may be learned by practice of the inventive concepts.

An embodiment of the inventive concept provides a window including a base substrate, which includes a transmission region and a bezel region in a plan view and includes a front surface and a rear surface that are opposite to each other in a thickness direction, a light-blocking layer, which is disposed on the rear surface of the base substrate and is overlapped with the bezel region, and a printing layer, which is disposed on the light-blocking layer and has a target surface, in which a barcode pattern is formed. The printing layer has a chromatic color, and a width of the printing layer is less than a width of the light-blocking layer.

The printing layer may be overlapped with the light-blocking layer and may be extended along the bezel region.

The light-blocking layer may include a first light-blocking layer disposed on the base substrate and a second light-blocking layer disposed on the first light-blocking layer, and a width of the first light-blocking layer may be equal to a width of the second light-blocking layer.

The first light-blocking layer, the second light-blocking layer, and the printing layer may have the same thickness.

The light-blocking layer may include a first inner side surface adjacent to the transmission region and a first outer side surface opposite to the first inner side surface, when viewed in a plan view. The printing layer may be disposed to be closer to the first outer side surface of the light-blocking layer than to the first inner side surface.

The printing layer may include a second inner side surface adjacent to the transmission region and a second outer side surface opposite to the second inner side surface, when viewed in the plan view. The second outer side surface of the printing layer may be aligned to the first outer side surface of the light-blocking layer in the thickness direction.

The light-blocking layer may have an achromatic color.

The barcode pattern may be a matrix-shaped two-dimensional pattern.

The barcode pattern may be carved in the target surface of the printing layer in an intaglio manner.

A thickness of the light-blocking layer may be greater than a thickness of the printing layer.

A plurality of the barcode patterns may be formed in the target surface.

Another embodiment of the inventive concept provides a display device including a display module, which includes a display region and a non-display region adjacent to the display region, and a window, which is disposed on the display module. The window may include a base substrate, which is divided into a transmission region overlapped with the display region and a bezel region overlapped with the non-display region and includes a front surface, which displays an image, and a rear surface, which is opposite to the front surface in a thickness direction and faces the display module, a light-blocking layer, which is disposed on the rear surface of the base substrate and is overlapped with the bezel region, and a printing layer, which is disposed on the light-blocking layer and has a target surface, in which an intaglio barcode pattern is provided. The printing layer has a chromatic color, and a width of the printing layer is less than a width of the light-blocking layer.

The light-blocking layer may be extended along the bezel region, and the printing layer may be fully overlapped with the light-blocking layer.

The width of the light-blocking layer may be at least 1.3 mm.

The width of the printing layer may be less than the width of the light-blocking layer by at least 0.1 mm.

The light-blocking layer may have a black color, and the printing layer may have a white color.

Another embodiment of the inventive concept provides a method of fabricating a window, including providing a base substrate, which includes a transmission region and a bezel region in a plan view and includes a front surface displaying an image and a rear surface opposite to the front surface in a thickness direction, forming a light-blocking layer on the rear surface of the base substrate to be overlapped with the bezel region, forming a printing layer of a chromatic color on the light-blocking layer, and carving a barcode in a target surface of the printing layer. The carving of the barcode includes etching a portion of the target surface of the printing layer.

The etching of the portion of the printing layer may include irradiating a laser beam onto the portion of the target surface of the printing layer.

The light-blocking layer may include a plurality of light-blocking layers. A thickness of each of the plurality of light-blocking layers may be equal to a thickness of the printing layer.

The light-blocking layer and the printing layer may be fully overlapped with the bezel region, and a width of the printing layer may be less than a width of the light-blocking layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Embodiments of the inventive concepts will now be described more fully with reference to the accompanying drawings, in which embodiments are shown. The inventive concepts may, however, be embodied in many different forms and should not be construed as being limited to the embodiments set forth herein. Rather, these embodiments are provided so that this disclosure will be thorough and complete, and will fully convey the inventive concepts to those of ordinary skill in the art. In the drawings, the thicknesses of layers and regions are exaggerated for clarity.

Like reference numerals in the drawings denote like elements, and thus, their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1A:
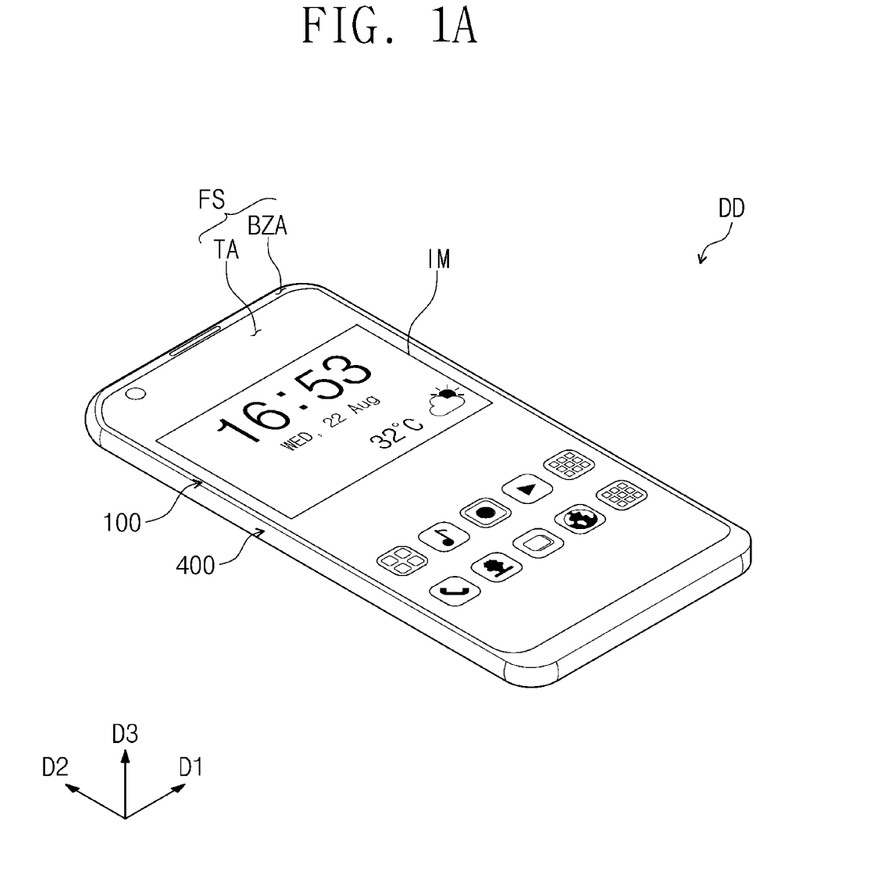
FIG. 1A is a perspective view illustrating a display device according to an embodiment of the inventive concept.
Figure 1B:
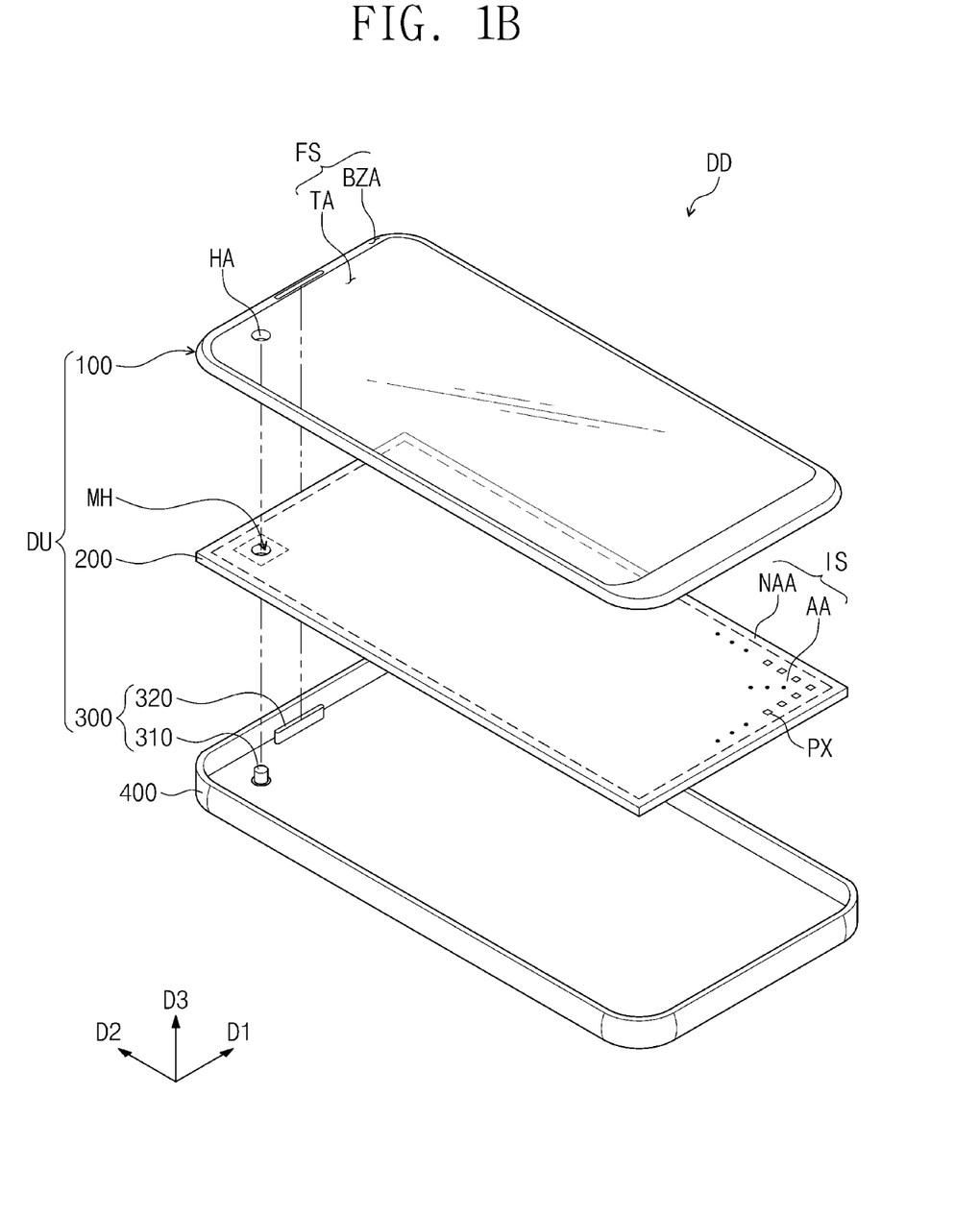
FIG. 1B is an exploded perspective view illustrating a display device according to an embodiment of the inventive concept.

FIG. 1A is a perspective view illustrating a display device according to an embodiment of the inventive concept. FIG. 1B is an exploded perspective view illustrating a display device according to an embodiment of the inventive concept.

Referring to FIGS. 1A and 1B, a display device DD may display an image IM in a third direction D3 that is normal to a planar surface defined by a first direction D1 and a second direction D2. The display device DD may include a window 100, a display module 200, an electronic module 300, and a housing member 400. The window 100, the display module 200, and the electronic module 300 may be combined to constitute a display unit DU.

The window 100 may be disposed on the display module 200 to cover a front surface IS of the display module 200. The window 100 may include a front surface FS that is exposed to the outside. The image IM displayed on the display module 200 may be provided to a user through the front surface FS. The front surface FS of the window 100 may include a transmission region TA and a bezel region BZA, when viewed in a plan view.

The transmission region TA may allow light incident thereto pass therethrough. The transmission region TA may have a shape corresponding to an active region AA of the display module 200. For example, the transmission region TA may be overlapped with a front surface of the active region AA or with at least a portion thereof. The image IM, which is displayed on the active region AA of the display module 200, may be provided to a user through the transmission region TA.

The bezel region BZA may have relatively low optical transmittance, compared with the transmission region TA. The bezel region BZA may define a shape of the transmission region TA. The bezel region BZA may be adjacent to the transmission region TA and may enclose the transmission region TA.

The bezel region BZA may have a predetermined color. The bezel region BZA may cover a peripheral region NAA of the display module 200 and may prevent the peripheral region NAA from being observed by a user.

The display module 200 may display the image IM on the front surface IS. The front surface IS may include the active region AA and the peripheral region NAA. The image IM may be displayed on the active region AA. The peripheral region NAA may be adjacent to the active region AA.

The display module 200 may include a plurality of pixels PX. The pixels PX may display lights in response to electrical signals. The lights displayed by the pixels PX may constitute the image IM.

In the present embodiment, a penetration hole penetrating the display module 200 may be defined in the display module 200. For example, a module hole MH may be defined in the active region AA of the display module 200.

The module hole MH may be overlapped with a hole region HA of the window 100. The module hole MH may be defined in the active region AA. Accordingly, some of the pixels PX may be arranged to enclose the module hole MH. The image IM may also be displayed on a region adjacent to the module hole MH.

The electronic module 300 may include various functional modules, which are used to operate the display device DD. The electronic module 300 may be electrically connected to the display module 200 through a connector (not shown) or the like. For example, the electronic module 300 may be or include a camera or a light or heat sensing sensor. For example, the electronic module 300 may receive an external input, which is transmitted through the module hole MH and the hole region HA, or may provide output signals to the outside through the module hole MH and the hole region HA.

The housing member 400 may be disposed below the display module 200. The housing member 400 may be combined to the window 100 to define an outer appearance of the display device DD. The housing member 400 may include a material having a relatively high strength. For example, the housing member 400 may include a plurality of frames and/or plates, each of which is formed of at least one of glass, plastic, or metallic materials.

The housing member 400 may provide a storage space. The display module 200 and the electronic module 300 may be disposed in the storage space and may be protected from an external impact.

According to an embodiment of the inventive concept, a portion of the electronic module 300 may be disposed to be overlapped with the active region AA of the display module 200 and the transmission region TA of the window 100. Thus, it may be possible to reduce the area of the bezel region BZA and thereby improve the appearance quality of the display device DD.

Figure 2A:
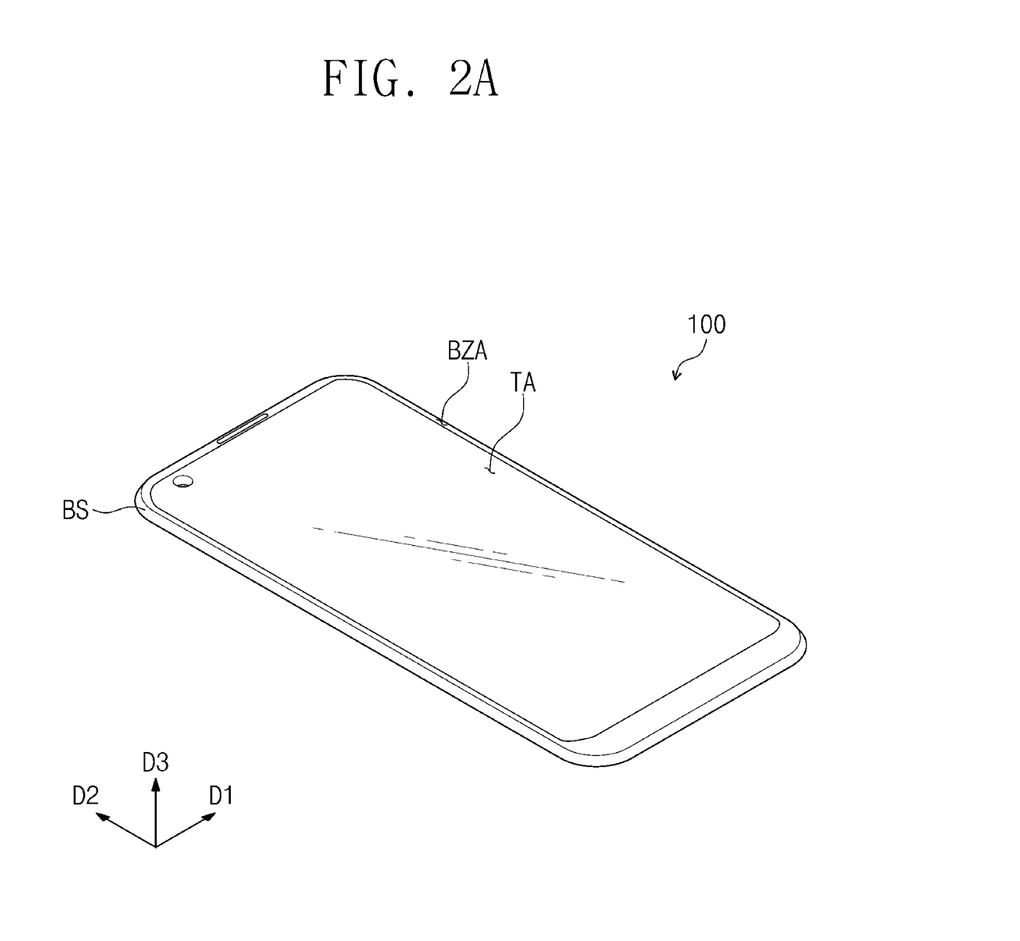
FIG. 2A is a perspective view illustrating a window according to an embodiment of the inventive concept.
Figure 2B:
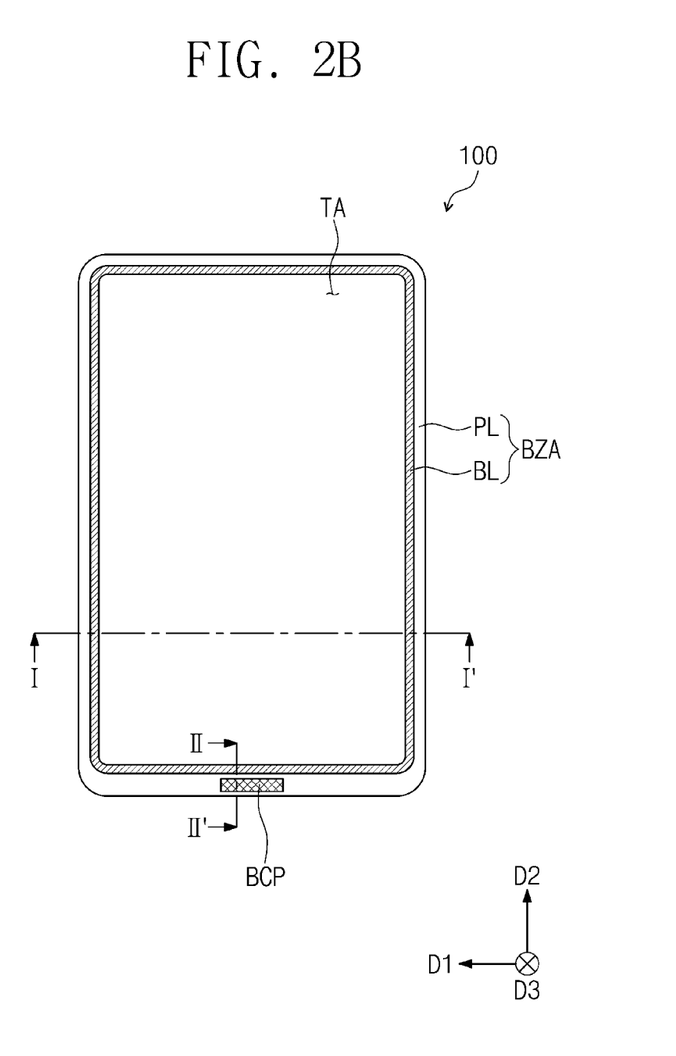
FIG. 2B is a plan view illustrating a window according to an embodiment of the inventive concept.

FIG. 2A is a perspective view illustrating a window according to an embodiment of the inventive concept. FIG. 2B is a plan view illustrating a window according to an embodiment of the inventive concept. In detail, FIG. 2A illustrates an example of a rear surface of the window.

Referring to FIGS. 2A and 2B, the window 100 may include a base substrate BS, a light-blocking layer BL, and a printing layer PL. The window 100 may be realized as various embodiments, and the inventive concept is not limited to a specific embodiment. The base substrate BS may be optically transparent. For example, the base substrate BS may be formed of or include at least one of glass or plastic materials. The base substrate BS may have a multi- or single-layered structure. For example, the base substrate BS may have a stacking structure including a plurality of plastic films, which are coupled to each other by an adhesive layer, or may have a stacking structure including a glass substrate and a plastic film, which are coupled to each other by an adhesive layer.

In an embodiment, the base substrate BS may include the transmission region TA and the bezel region BZA, when viewed in a plan view. The base substrate BS may include a front surface, which is used as the front surface FS of the window 100, and a rear surface opposite to the front surface.

The light-blocking layer BL may be disposed on the rear surface of the base substrate BS. The light-blocking layer BL may be overlapped with the bezel region BZA of the base substrate BS. The light-blocking layer BL may cover the bezel region BZA. In an embodiment, the light-blocking layer BL may substantially define the bezel region BZA of the window 100. The light-blocking layer BL may be extended along the bezel region BZA.

As shown in FIG. 2B, the printing layer PL may be disposed on the light-blocking layer BL. The printing layer PL may include a bottom surface in contact with the light-blocking layer BL and a top surface opposite to the bottom surface, and hereinafter, the top surface of the printing layer PL will be referred to as a target surface. In the present embodiment, the printing layer PL may be fully overlapped with the light-blocking layer BL. For example, the printing layer PL may be overlapped with the light-blocking layer BL and may be extended along the bezel region BZA surrounding the transmission region TA. The printing layer PL may be disposed on the entire region of the light-blocking layer BL, which defines the edge region (e.g., the bezel region BZA) of the window 100.

The printing layer PL may include a barcode pattern BCP provided on the target surface. The barcode pattern BCP may mean a code pattern that is constructed by a certain combination of black and white lines, whose thicknesses or shapes can be interpreted by a computer. The barcode pattern BCP may include a linear barcode or a matrix code.

Figure 3:
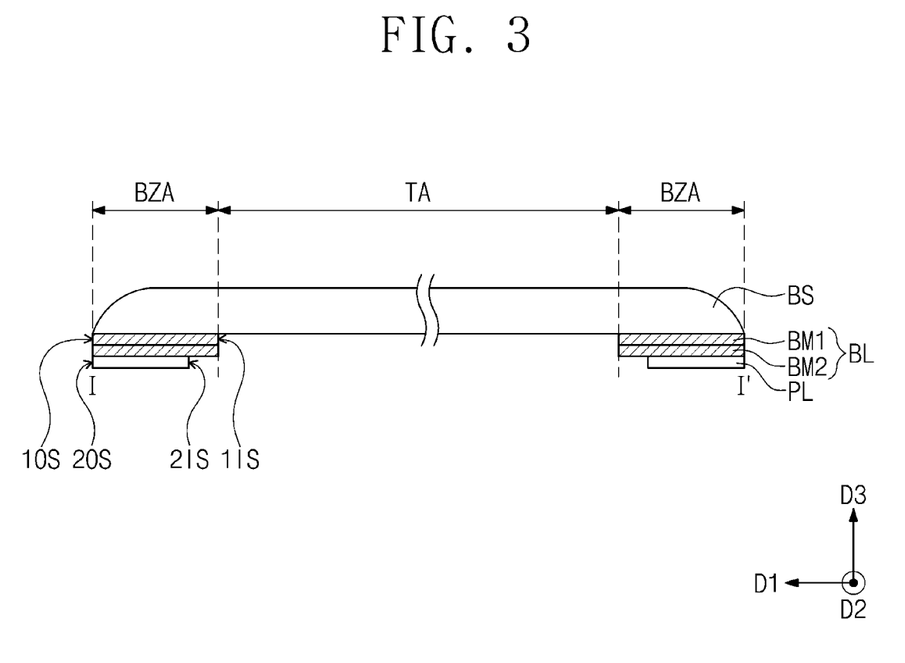
FIG. 3 is a sectional view illustrating a window according to an embodiment of the inventive concept.
Figure 4:
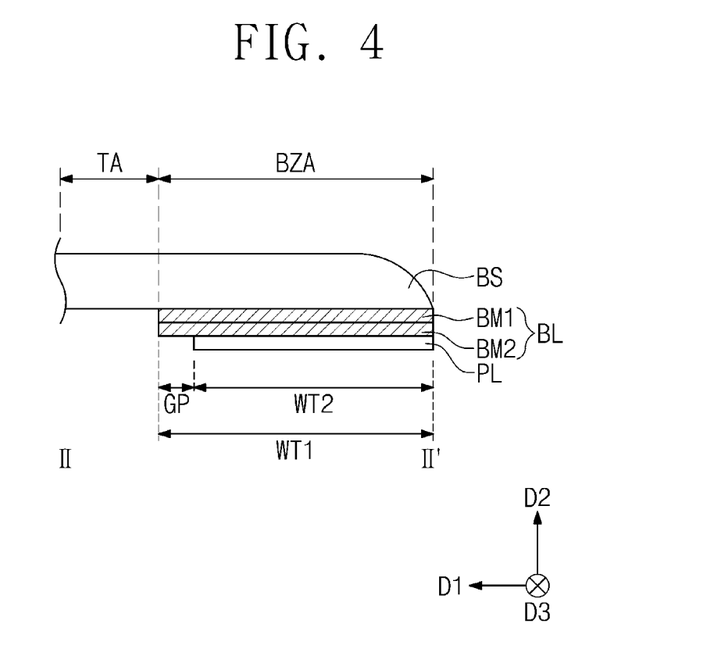
FIG. 4 is a sectional view illustrating a window according to an embodiment of the inventive concept.

FIG. 3 is a sectional view illustrating a window according to an embodiment of the inventive concept. For example, FIG. 3 illustrates a cross-section taken along line I-I' of FIG. 2B. FIG. 4 is a sectional view illustrating a window according to an embodiment of the inventive concept. For example, FIG. 4 illustrates a cross-section taken along line II-IT of FIG. 2B.

Referring to FIG. 3, the light-blocking layer BL may include a first light-blocking layer BM1 disposed on the base substrate BS and a second light-blocking layer BM2 disposed on the first light-blocking layer BM1. In an embodiment, a width of the first light-blocking layer BM1 may be substantially equal to a width of the second light-blocking layer BM2. Here, the width of an element may mean a length of the element measured in the first direction D1.

The light-blocking layer BL may include a first inner side surface HS adjacent to the transmission region TA and a first outer side surface 1OS opposite to the first inner side surface HS, when viewed in a plan view. The printing layer PL may be disposed on the light-blocking layer BL to be closer to the first outer side surface 1OS of the light-blocking layer BL than to the first inner side surface HS. In an embodiment, the printing layer PL may include a second inner side surface 2IS adjacent to the transmission region TA and a second outer side surface 2OS opposite to the second inner side surface 2IS, when viewed in a plan view. The second outer side surface 2OS of the printing layer PL may be aligned with the first outer side surface 1OS of the light-blocking layer BL in a thickness direction. The second inner side surface 2IS of the printing layer PL may not be aligned with the first inner side surface HIS of the light-blocking layer BL. In the case where the light-blocking layer BL is aligned with the first and second outer side surfaces 1OS and 2OS of the printing layer PL, the second inner side surface 2IS of the printing layer PL may be spaced apart from the first inner side surface HIS of the light-blocking layer BL in the first direction, because a width of the printing layer PL is less than a width of the light-blocking layer BL. Since the second inner side surface 2IS of the printing layer PL is disposed at a position that is farther away from the transmission region TA than the first inner side surface HIS of the light-blocking layer BL, it may be possible to prevent the printing layer PL from being observed through the transmission region TA.

In an embodiment, a thickness of the light-blocking layer BL may be greater than a thickness of the printing layer PL. The light-blocking layer BL may have a thickness that is great enough to prevent the printing layer PL on the light-blocking layer BL from being recognized by a user through the bezel region BZA. The printing layer PL may also have a thickness that is great enough to carve the barcode pattern BCP therein. For example, the light-blocking layer BL may include a plurality of light-blocking layers, each of which has a thickness of about 0.1 mm. The printing layer PL may have a thickness of about 0.1 mm. The thickness of the light-blocking layer BL, which is composed of the plurality of light-blocking layers, may be 0.2 mm or thicker that is greater than the thickness of the printing layer PL.

Referring to FIG. 4, a width WT1 of the light-blocking layer BL may be greater than a width WT2 of the printing layer PL. In an embodiment, the width WT1 of the light-blocking layer BL may be at least 1.3 mm. The width WT2 of the printing layer PL may be less than the width WT1 of the light-blocking layer BL by at least 0.1 mm. When viewed in a plan view, a distance or gap GP between the printing layer PL and the light-blocking layer BL may be at least 0.1 mm.

Figure 5:
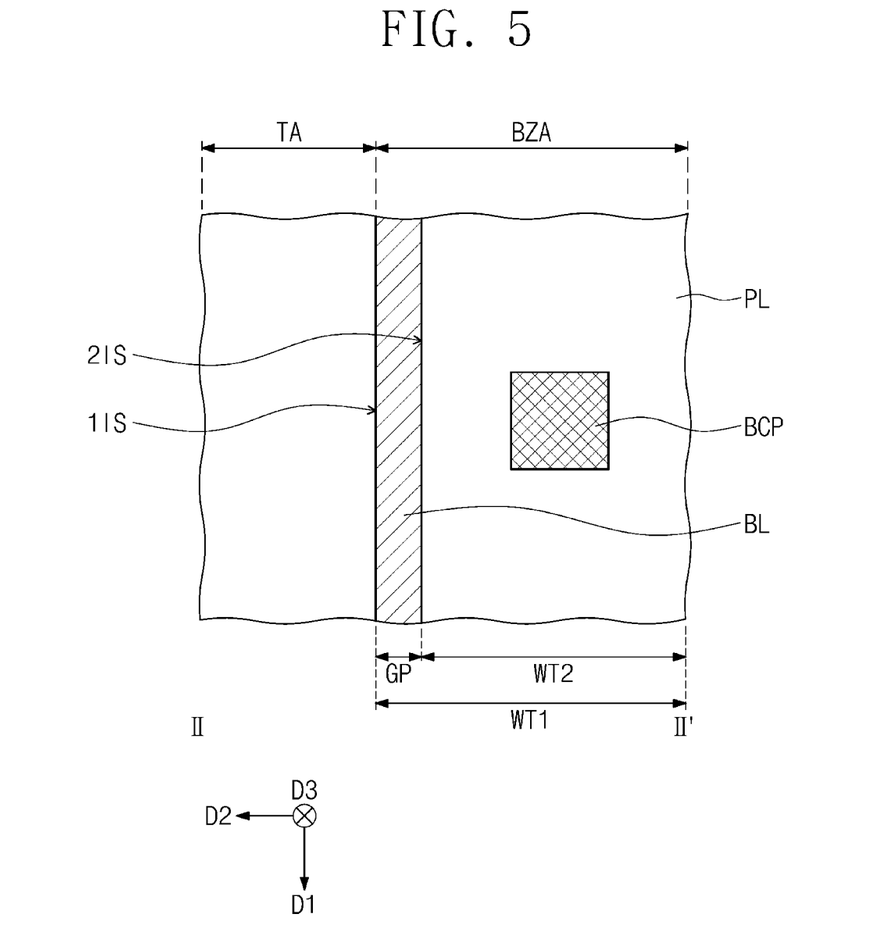
FIG. 5 is a plan view illustrating a window according to an embodiment of the inventive concept.

FIG. 5 is a plan view illustrating a window according to an embodiment of the inventive concept. For example, FIG. 5 illustrates an enlarged shape of a portion (e.g., the portion II-II of FIG. 4) of the rear surface of the window.

The light-blocking layer BL may have an achromatic color. For example, the light-blocking layer BL may have a black color. The printing layer PL may have a chromatic color. For example, the printing layer PL may have a white color. The barcode pattern BCP may be disposed on the printing layer PL. In detail, the barcode pattern BCP may be carved in a portion of the target surface of the printing layer PL. The barcode pattern BCP may be a matrix-shaped two-dimensional pattern. For example, the barcode pattern BCP may be a quick response (QR) code. The barcode pattern BCP may be formed in the target surface of the printing layer PL in an intaglio manner. In the drawings, the barcode pattern BCP is illustrated be formed in a region of the printing layer PL located lower part of the window 100, but the inventive concept is not limited to this example. For example, the barcode pattern BCP may be formed in any region of the printing layer PL.

Figure 6A:
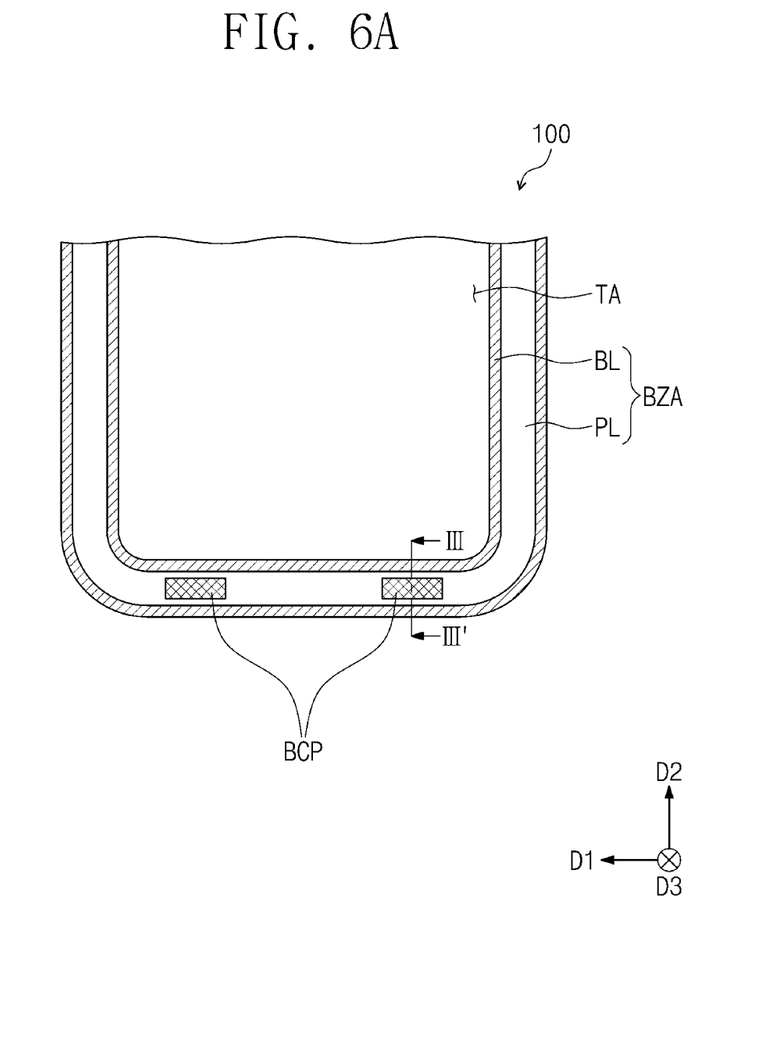
FIG. 6A is a plan view illustrating a window according to an embodiment of the inventive concept.
Figure 6B:
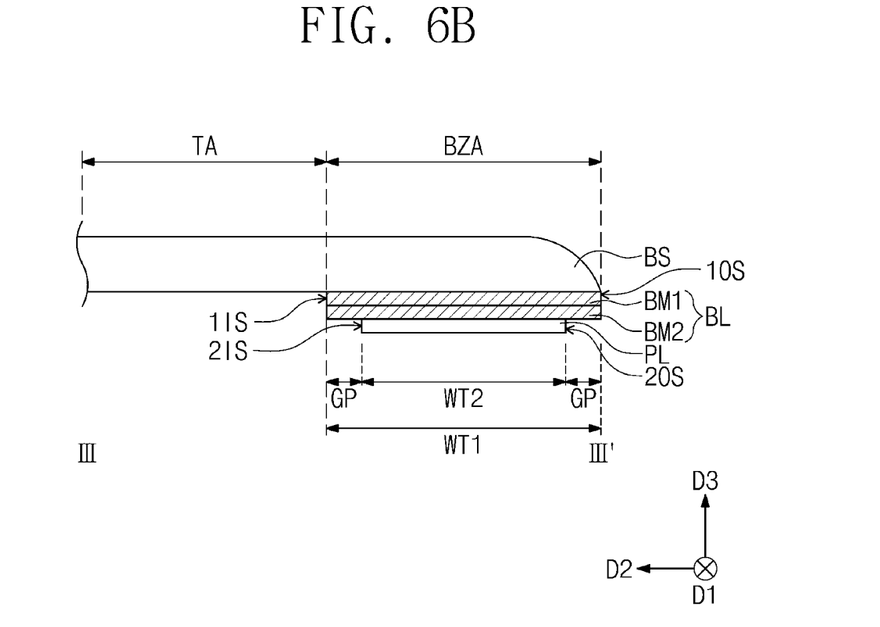
FIG. 6B is a sectional view illustrating a window according to an embodiment of the inventive concept.

FIG. 6A is a plan view illustrating a window according to an embodiment of the inventive concept. For example, FIG. 6A illustrates another example of the rear surface of the window. FIG. 6B is a sectional view illustrating a window according to an embodiment of the inventive concept. For example, FIG. 6B illustrate a cross-section taken along a line III-III' of FIG. 6A.

In an embodiment, a plurality of the barcode patterns BCP may be provided. There may be no restriction on the position of the barcode pattern BCP formed on the target surface of the printing layer PL. In the present embodiment, the printing layer PL may be disposed to enclose the transmission region TA, because the printing layer PL is extended along the bezel region BZA. In the drawings, the barcode pattern BCP is illustrated to be formed below the window 100, but the inventive concept is not limited to this example. For example, a plurality of the barcode patterns BCP may be freely formed on the target surface of the printing layer PL.

In an embodiment, the printing layer PL may not be aligned with the light-blocking layer BL. The first inner side surface HS and the first outer side surface 1OS of the light-blocking layer BL may not be aligned to the second inner side surface 2IL and the second outer side surface 2OS of the printing layer PL, respectively, in the thickness direction. Here, the thickness direction may be the third direction D3. In an embodiment, a separation distance GP between the first inner side surface HIS and the second inner side surface 2IS may be equal to a separation distance GP between the first outer side surface 1OS and the second outer side surface 2OS and may be for example, 0.1 mm. In some embodiments, the separation distance GP between the first inner side surface HIS and the second inner side surface 2IS may be different from the separation distance GP between the first outer side surface 1OS and the second outer side surface 2OS. For example, the separation distance GP between the first inner side surface HIS and the second inner side surface 2IS may be greater than the separation distance GP between the first outer side surface 1OS and the second outer side surface 2OS. In other words, although the separation distance GP between the first inner side surface HIS and the second inner side surface 2IS is illustrated to be equal to the separation distance GP between the first outer side surface 1OS and the second outer side surface 2OS, the inventive concept is not limited to this example.

Figure 7:
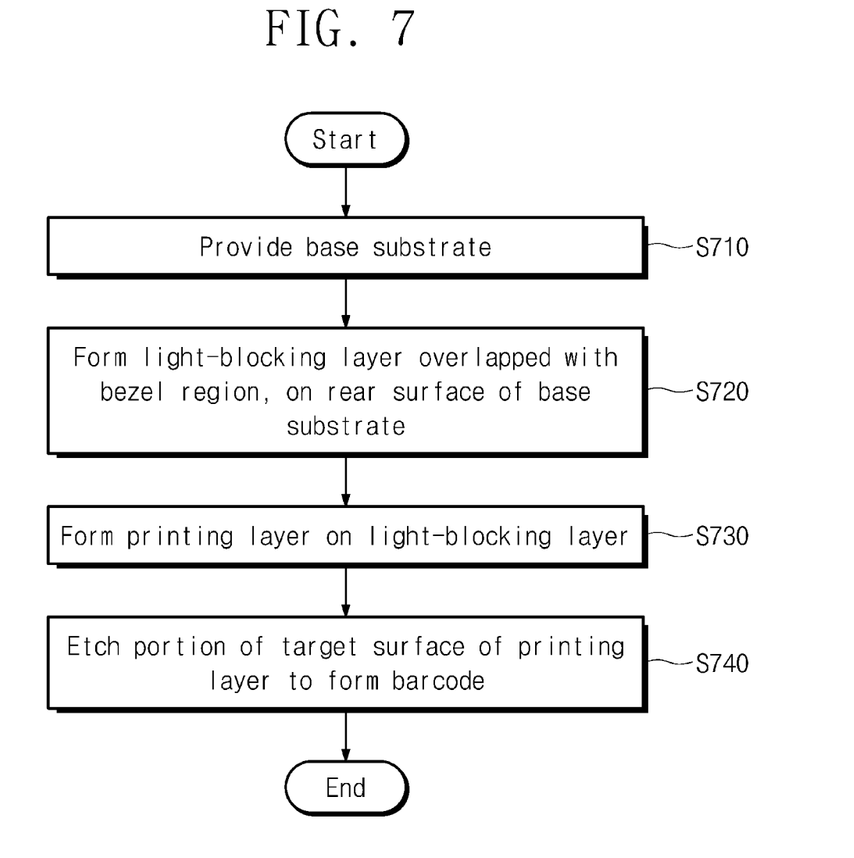
FIG. 7 is a flow chart illustrating a method of fabricating a display device, according to an embodiment of the inventive concept.

FIG. 7 is a flow chart illustrating a method of fabricating a display device, according to an embodiment of the inventive concept.

Referring to FIG. 7, a method of fabricating a display device may include providing a base substrate (in S710); forming a light-blocking layer, which is overlapped with a bezel region of a window, on a rear surface of the base substrate (in S720); forming a printing layer of a chromatic color on the light-blocking layer (in S730); and carving a barcode in a target surface of the printing layer (in S740).

In an embodiment, the base substrate may correspond to a glass substrate, and the forming of the light-blocking layer may include directly disposing the light-blocking layer on a rear surface of the glass substrate. The light-blocking layer may have a multi-layered structure including a plurality of layers. The layers constituting the light-blocking layer may have substantially the same thickness. For example, each of the layers constituting the light-blocking layer may be formed to have a thickness of about 0.1 mm. In an embodiment, the printing layer may be formed to have a single-layered structure. A thickness of the printing layer may be about 0.1 mm. The thickness of the printing layer may be less than or equal to the thickness of the light-blocking layer.

A width of the printing layer may be less than a width of the light-blocking layer. The light-blocking layer may be formed to enclose the transmission region. The printing layer may be disposed on the light-blocking layer and may be formed to be spaced apart from the transmission region. The light-blocking layer may be formed to have a black color, and the printing layer may be formed to have a white color. The printing layer may have the same stacking structure as the light-blocking layer. The printing layer may be formed by the same process as that for the light-blocking layer.

In an embodiment, the carving of the barcode may include etching a portion of the target surface of the printing layer. For example, the carving of the barcode may include irradiating a laser beam onto the target surface of the printing layer. In other words, the barcode pattern may be formed by irradiating the laser beam onto the target surface of the printing layer. The barcode pattern may be formed on the printing layer in an intaglio manner.

According to the inventive concept, it may be possible to reduce an area of a bezel region of a window and to increase an area of a display region of the window. In addition, a display device including the window and a method of fabricating the window are provided.

According to an the inventive concept, a printing layer, in which a barcode pattern to be displayed during a fabrication process is provided, may be disposed throughout the bezel region, and this may make it possible to reduce an area of a bezel region required for a barcode patterning.

Although certain embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of fabricating a window, comprising:
providing a base substrate including a transmission region and a bezel region in a plan view and including a front surface displaying an image and a rear surface opposite to the front surface in a thickness direction,
forming a light-blocking layer on the rear surface of the base substrate to be overlapped with the bezel region;
forming a printing layer of a chromatic color on the light-blocking layer; and
carving a barcode in a target surface of the printing layer, wherein:
the carving of the barcode comprises etching a portion of the target surface of the printing layer;
the light-blocking layer and the printing layer are fully overlapped with the bezel region; and
a width of the printing layer is less than a width of the light-blocking layer.

2. The method of claim 1, wherein the etching of the portion of the printing layer comprises irradiating a laser beam onto the portion of the target surface of the printing layer.

3. The method of claim 1, wherein:
the light-blocking layer comprises a plurality of light-blocking layers; and
a thickness of each of the plurality of light-blocking layers is equal to a thickness of the printing layer.

* * * * *